Aug. 2, 1955

E. K. BENEDEK 2,714,378

AIR HEATING METHOD

Filed Oct. 6, 1951

Inventor
Elek K. Benedek
By Hill, Sherman, Meroni, Gross & Simpson
ATTORNEYS

Fig. 6

United States Patent Office 2,714,378
Patented Aug. 2, 1955

2,714,378

AIR HEATING METHOD

Elek K. Benedek, Chicago, Ill., assignor to Porta Products Corporation, Rock Island, Ill., a corporation of Illinois Application October 6, 1951, Serial No. 250,169

2 Claims. (Cl. 126—110)

This invention relates to space heaters and, more particularly, to a method and apparatus for space heating wherein the heat is furnished by combustion.

Specifically, this invention involves a method for space heating wherein the sole energy input is supplied by combustion, a portion of the energy so supplied being employed to operate the apparatus for carrying out the instant heating method and the remainder of the energy so supplied being employed principally for space heating.

In gas turbine power generators, a high velocity gas from a high temperature-high pressure gas source operates a gas turbine for generating power. Part of the power generated by the turbine, however, is sometimes employed in the generation of the high temperature-high pressure gas. For example, the turbine may operate a gas compressor which discharges into a combustion chamber wherein high temperature-high pressure gas may be generated. If the turbine and the compressor are coaxially mounted on one shaft, the turbine output is the torque energy available at the shaft, which is actually the amount of energy that remains after an initial portion of the (torque) energy has been employed to operate the compressor for the generation of high pressure-high temperature gas. The most desirable operation of such a gas turbine thus involves the maximum turbine efficiency wherein the maximum amount of energy contained in the high pressure-high temperature gas is converted to available torque energy by the turbine (and the minimum amount of energy is expended in the operation of the compressor).

In the well known so-called "jet engine" an entirely different cooperation between a compressor and a turbine (coaxially mounted) is contemplated. An air compressor operating at maximum pressure and capacity discharges into a combustion chamber wherein maximum efficiency fuel is burned to yield a blast of hot air of maximum pressure or thrust. The blast of hot air discharging from the combustion chamber passes through a turbine, so as to impart enough torque energy thereto to operate the compressor, and then passes out to the atmosphere at maximum thrust. The principal object in the jet engine is the generation of maximum hot air thrust and the dissipation of as little as possible thereof in the operation of the turbine which in turn operates the air compressor. Accordingly, an impulse turbine is used, since such a turbine brings about a minimum reduction in pressure in a gas passing therethrough.

Heretofore compressor-turbine combinations were used for two specific and distinct purposes. In power generation, a compressor-turbine combination was used to generate a maximum amount of energy in the form of a high pressure-high temperature gas and then, by means of the turbine, to convert the maximum amount of energy in such gas to torque energy. In a jet engine, the compressor-turbine combination was used to generate the maximum amount of energy in the form of a high temperature-high pressure gas and thereafter to convert such energy to thrust energy, dissipating the minimum amount of such thrust energy for compressor operation. In each, the object was the complete conversion of combustion generated energy to mechanical energy.

The instant invention is based upon discovery of a method and apparatus wherein a compressor-turbine combination is employed in a space heater to generate a maximum amount of heat energy in a pressurized high temperature gas, that involves the conversion of a minimum amount of such heat energy to mechanical energy for the purpose of operating the compressor and the loss of a minimum amount of such heat energy by conversion to unused torque or thrust energy.

In the space heaters heretofore used, wherein the heat generation involved combustion, such combustion was carried out at substantially atmospheric pressure. By the use of combustion at atmospheric pressure it was possible to obtain high heat efficiency, since the opportunities for conversion of the energy generated by combustion to mechanical energy or some type of energy other than heat energy were minimized. On the other hand, such space heaters leave much to be desired with respect to capacity. There is very little flexibility with respect to the operation of such space heaters and the capacity or B. t. u. (British termal units) output is dependent almost entirely upon the size of the heat generating unit of the heater. At atmospheric pressure, a given volume of air is necessary to burn a given amount of fuel, which in turn results in the generation of, for example, a given number of B. t. u. of heat energy.

It is, therefore, an object of the instant invention to provide an improved space heating method.

It is a further object of the instant invention to provide a space heating method having flexibility of operation with respect to its capacity.

It is yet another object of the instant invention to provide a method of handling heat energy so that there is a minimum dissipation thereof other than the use of a specified amount for contributing to the generation of additional heat energy.

It is yet a further object of the instant invention to provide a space heating method capable of economic operation.

Other and further objects of the invention will be apparent to those skilled in the art from the following detailed description of the annexed sheets of drawings which, by way of preferred examples only, illustrate embodiments of the invention.

Figure 1:
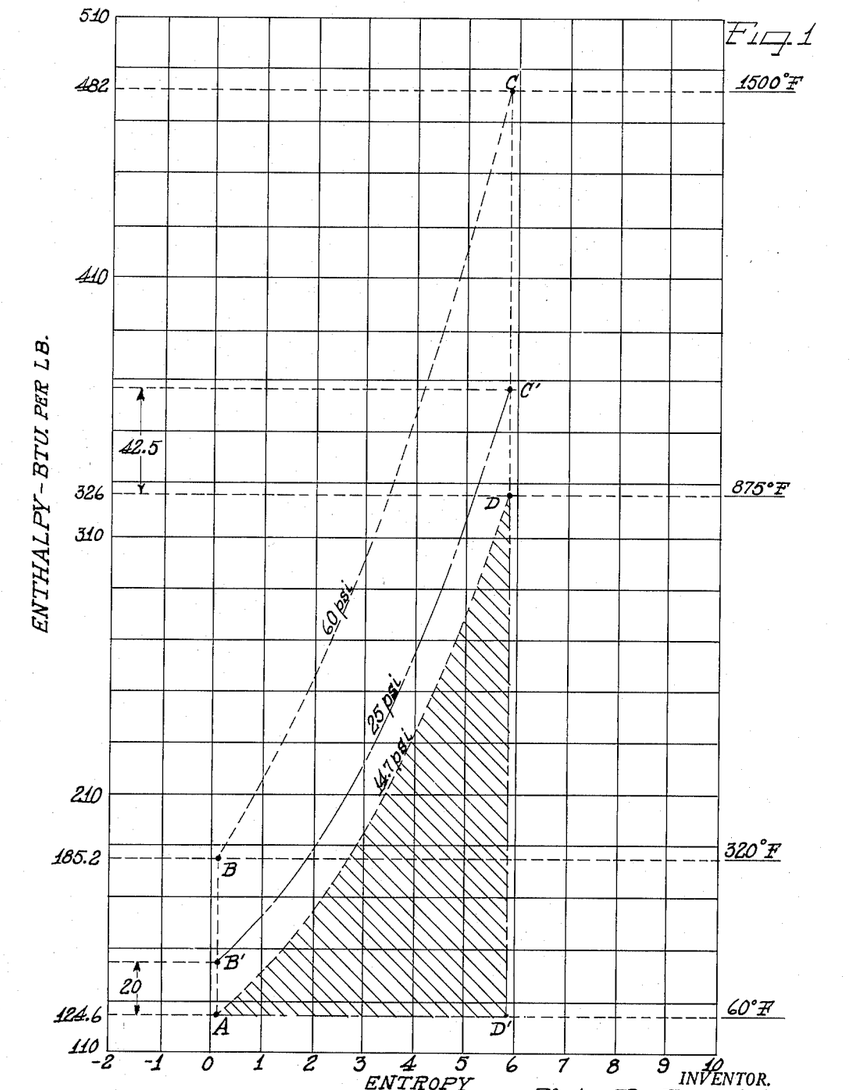
Figure 1 is an enthalpy-entropy diagram showing the energy relationships involved in the instant invention.

In the chart in Figure 1, the letter A designates the temperature (60° F., as shown on the right hand side of the chart) as well as the enthalpy (124.6 B. t. u., as shown on the left hand side of the chart) of a pound of air at approximately atmospheric conditions of temperature and pressure. The letter B designates the same properties in that pound of air after it has been compressed adiabatically to 60 pounds per square inch pressure (absolute), assuming air to be an ideal gas.

It can be seen that the temperature of the air is raised from 60° F. to 320° F. by compressing the air to 60 pounds per square inch pressure (absolute) under adiabatic conditions (i. e., without change of heat content of the air by external addition or subtraction of heat).

It can also be seen that the enthalpy or energy content of the pound of air has increased from 124.6 to 185.2 B. t. u., which is a gain of 60.6 B. t. u. enthalpy. A B. t. u. is a unit of energy and a B. t. u. per minute is a unit of power. One B. t. u. per minute, for example, equals 0.02357 horsepower; and 60.6 B. t. u. per minute equals 60.6 times 0.02357, which equals 1.428 horsepower. Accordingly, a 1.428 horsepower compressor is required to compress one pound of atmospheric air per minute to air at 60 pounds per square inch pressure (absolute).

If heat is added to the pound of air, for example, by burning fuel therein while maintaining the air at a constant pressure of 60 pounds per square inch (absolute), the enthalpy of the air increases along the line BC on the chart (again assuming the air to be an ideal gas). The addition of a sufficient amount of heat to the pound of air to heat it to 1500° F. involves an increase in the enthalpy to 482 B. t. u., as shown at the point C in the chart. Such is the character of the thermodynamic phenomena which take place during the combustion of fuel in pressurized air.

If the heated pressurized pound of air having the properties designated at C in the chart is reduced adiabatically to atmospheric pressure, its properties become those designated at D in the chart. In other words, the temperature drops from 1500° F. to 875° F.; and the enthalpy of the pound of air drops from 482 B. t. u. to 326 B. t. u. The enthalpy drop resulting from the pressure drop back to atmospheric pressure is thus 156 B. t. u., or over 2½ times the number of B. t. u. required to compress the original pound of air from atmospheric pressure to 60 pounds per quare inch (absolute).

It can thus be seen that, assuming no friction losses, etc., only 60.6 B. t. u. of the total of 156 B. t. u. which is the enthalpy of the heated pressurized pound of air, needs to be employed for the compression of a second pound of air (from point A to point B on the chart). The remaining enthalpy, namely, 156 minus 60.6 which equals 95.4 B. t. u., may thus be converted to torque or thrust mechanical energy. In a 100% efficient compressor-turbine combination involving the foregoing conditions, the amount of torque energy which must be imparted to the turbine by the heated pressurized air in order to generate additional compressed air for combustion heating is thus equivalent to only 60.6 B. t. u.

In the uses heretofore made of compressor-turbine units, the main object was to approach as nearly as possible 100% compressor-turbine efficiency, so that a minimum amount of the enthalpy of the heated pressurized air needed to be employed to maintain the necessary compressed air supply at the inlet to the combustion chamber. In the power units, the main object was to approach 100% efficiency in the conversion of the enthalpy of the heated pressurized air to torque energy by means of the turbine (a small proportion of such torque energy being used to operate the air compressor). In the jet engine, the main object was to approach as nearly as possible 100% efficiency in the operation of the turbine (driving the air compressor), so that a minimum pressure loss took place in the heated pressurized air passing through the turbine and, therefore, a minimum loss in the thrust energy took place in the heated pressurized air jet passing through the turbine.

Turbines are broadly classified according to the manner in which the heat in the pressurized gas operating the turbines is converted into mechanical energy. In the impulse-type turbine, heated pressurized gas is passed through "stator" nozzles from which it issues as very high velocity jets. The highly velocity jets are directed against blades that are attached to a rotor. The velocity of the gas jets in passing against and by the rotor blades is reduced and converted by the moving blades into mechanical energy, but there is no drop in pressure in the moving blades, since the gas is not expanded as it passes through the blades.

In a reaction turbine, in contrast, the pressurized gas expends in both the stator (stationary) blades or nozzles and in the rotor (moving) blades or buckets. Rotation is thus produced in the moving blades both by the impulse effects due to the high velocity of the jets issuing from the nozzles and the reaction of the gas expanding in the moving blades.

In a jet engine, of course, an impulse turbine is employed in order to have a minimum pressure drop across the turbine and therefore a minimum reduction in the thrust energy of the jet discharged from the turbine.

Heretofore the workers in the art sought to obtain the maximum mechanical energy output. In contrast, the instant invention involves a method and apparatus for obtaining the maximum heat energy output and minimum mechanical energy output or loss. The principal purpose of the prior workers was to obtain, as output from or the discharge of the turbine, a maximum amount of mechanical energy (i. e., torque or thrust). In the instant invention, the minimum amount of mechanical energy (discharged from the turbine as thrust energy as well as imparted to the turbine as torque energy) is desired. Instead, it is desired to obtain the use of a maximum amount of heat energy for heating purposes and the conversion of a minimum amount thereof to mechanical energy.

It would appear at first that the purpose of the instant invention renders a compressor-turbine unit wholly impractical therefor from a commercial point of view. For example, jet engines operate on the basis of maximum compression (capacity as well as pressure) so as to burn a maximum amount of fuel in a minimum of space (in a compact small combusting chamber) and thereby to obtain maximum energy in the heated pressurized air for conversion to thrust energy. The jet engine is designed for maximum peripheral speeds in both the compressor and the turbine.

Limited variation in the amount of fuel consumed in a jet engine is permitted. However, in order to obtain enough "jet" speed from the heated pressurized air to actually operate the turbine at a suitable peripheral speed to accomplish compression in the compressor, it is necessary to have a very great amount of mechanical thrust energy passing through the turbine. In other words, there is a definite minimum peripheral speed at which the compressor must operate in order to obtain air compression and the coaxially mounted turbine must operate at the same number of revolutions per minute that the compressor operates. Moreover, there is a definite minimum speed at which the turbine must operate in order for it to impart sufficient torque to the shaft to overcome the resistance to motion effected by the compressed air at the compressor exit. Accordingly, there is a definite minimum jet speed or pressurized thrust at which the hot air must pass through the impulse type turbine in order to maintain the given minimum number of revolutions per minute for the turbine.

Moreover, the limited amount of space in the relatively small combustion chamber of a jet engine makes the use of relatively high air pressure at the compressor discharge necessary in order to obtain a sufficient amount of combustion in the chamber necessary to bring about effective operation of the engine.

In gas power turbines, likewise, the operation involves the generation of a maximum amount of energy in the heated pressurized air for conversion to mechanical energy, in such cases, to torque energy. Complete removal of all energy from the heated pressurized air by the turbine is therefore desired. All the heat energy that can possibly be consumed is thus converted to mechanical energy.

In either case, the tremendous amount of mechanical energy imparted to or passing through the turbine would render space heating inefficient and perhaps impossible. The essential purpose of both jet engines and power turbines is to operate a "self-energizing" unit which generates a very great amount of excess mechanical energy (over that required for mechanically energizing the unit) by combustion in compressed air. The great excess of energy so obtained is unmanageable from a space heating point of view.

A preferred method of the instant invention comprises the steps of, continuously, compressing atmospheric air to a predetermined superatmospheric pressure, heating by exposure to an external heat source a predetermined portion of the air and releasing the externally heated air to the atmosphere to effect space heating, heating internally by fuel combustion therein the remainder of the air at from one and one-half to two atmospheres, causing the internally heated air to do a predetermined minimum amount of work for accomplishing the air-compressing step, and heating the external heat source with the internally heated air so as to effect maximum heat transfer from the internally heated air to the externally heated air.

It can thus be seen that in the instant process the enthalpy of the air is increased by a compression step and by an internal combustion step. The total enthalpy of the system is decreased by the expenditure of a certain minimum amount of energy for the air compressing step. Other than the minimum amount of energy consumed in the air compressing step, substantially the entire enthalpy generated by compression and internal combustion is ultimately transferred to the stream of fresh air referred to as the "externally heated air." The externally heated air released to the atmosphere for space heating possesses the predominate proportion of the energy departing from the heater, some of which is in the form of thrust energy but most of which is in the form of heat energy.

The unusual advantages of the instant invention may be readily appreciated by reference to the chart of Figure 1. Assuming again that a pound of atmospheric air (whose properties are designated by point A in the chart) is compressed adiabatically to 25 pounds per square inch (absolute), the properties of the pound of air then become those designated at the point B' in the chart. The increase in enthalpy is about 20 B. t. u. If fuel is then burned in that pound of compressed air in an amount sufficient to increase the entropy to the same extent that it was increased during the internal heating of the pound of air maintained at 60 pounds per square inch absolute, hereinbefore described, the properties of the instant pound of internally heated air are those designated by the point C' in the chart. The "entropy" is a thermodynamic concept referring to heat content; if, during a reversible change at a given absolute temperature a given amount of heat enters the system, the increase in entropy of the system equals that amount of heat divided by the absolute temperature. It can be seen from the chart that the loss in enthalpy involved in reducing the pressure of the internally heated air whose properties are designated at the point C' to atmospheric pressure results in the formation of a gas whose properties are designated by the point D in the chart. That results in a net loss of enthalpy of about 42½ B. t. u., which is approximately 2 and ⅛ times as much as the amount of enthalpy required to accomplish the initial compression of the pound of atmospheric air. Moreover, the amount of enthalpy remaining after the enthalpy required for compression is subtracted from the total enthalpy of the internally heated gas is only 22.5 B. t. u. per pound.

Theoretically, the remaining enthalpy of 22.5 B. t. u. per pound would be expected to represent lost energy in a space heating system. However, there are certain friction losses which must necessarily be overcome in the operation of a compressor-turbine system. Also, there are certain auxiliary units such as oil pumps, fuel pumps and ignition units which may be operated by the use of that remaining energy.

The instant invention, however, not only involves a method of operation which results in the minimum amount of "theoretical" enthalpy lost, but also which results in the maximum useful consumption of the so-called theoretical enthalpy loss. The maximum reduction in the theoretical enthalpy loss is effected by the use of low pressures during internal heating of the compressed air, so that the advantages of pressurized combustion may be obtained without the necessity of unusually high enthalpy losses (from a space heating point of view). Also, the theoretical enthalpy loss is cut to a minimum by the use of a reaction turbine, wherein the principal driving force for the turbine is the expansion of the internally heated compressed air. (In other words, by the use of a reaction turbine which effects a pressure drop in the air driving the turbine, it is possible to minimize the enthalpy losses taking place after the action of the turbine, which losses are based essentially on the amount of expansion necessary to return the internally heated air to atmospheric pressure).

On the other hand, the total enthalpy losses in the system are reduced substantially below the apparent theoretical enthalpy losses in the instant process because a portion of the compressed air (and, therefore, a portion of the total enthalpy) is used to furnish the stream of fresh air which is externally heated and then thrust out into space. That enthalpy is so employed that it brings about a certain amount of preheating of the fresh air stream (as the result of compression) as well as a definite amount of thrust energy in the fresh air stream, which is necessary in order to obtain effective space heating, particularly in the case of high capacity space heaters.

Figure 2:
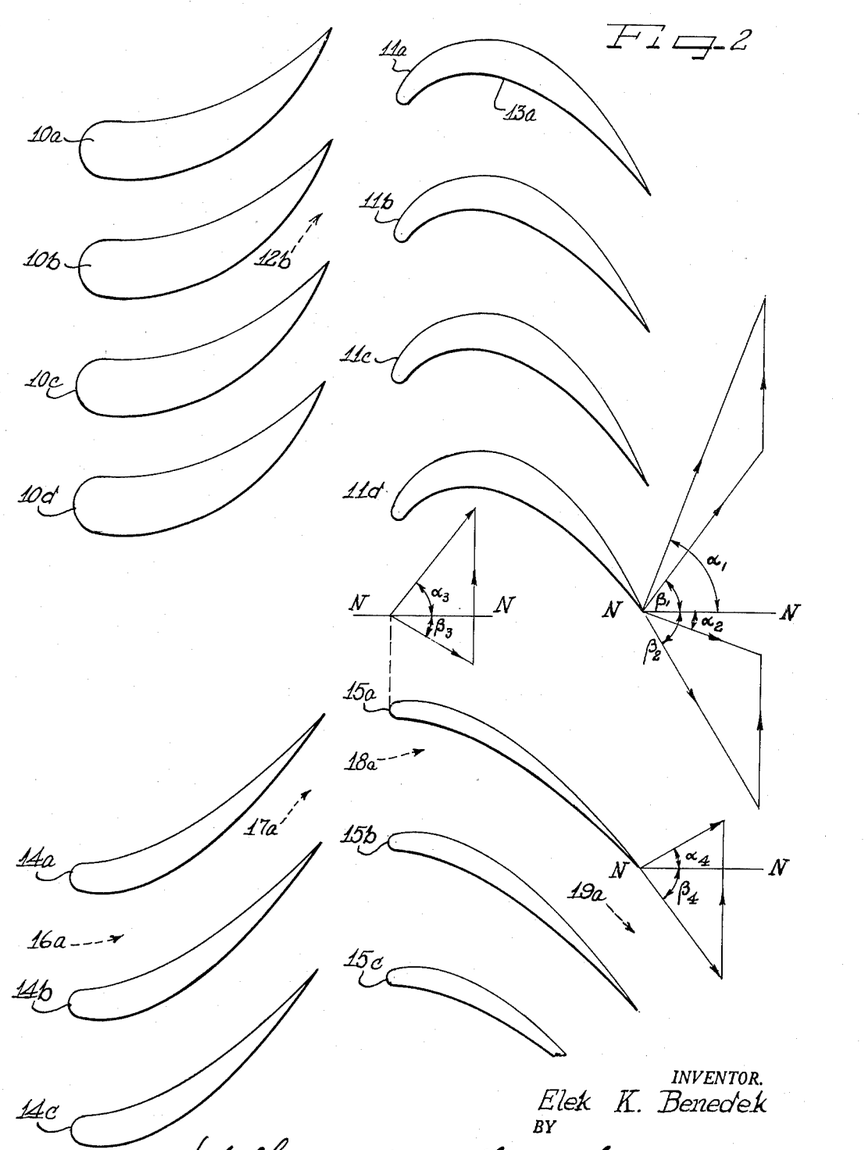
Figure 2 is a diagrammatic view of the rotor and stator blades or buckets employed in impulse and in reaction turbines.

In Figure 2, a set of impulse nozzles 10a, 10b, 10c and 10d is shown diagrammatically in position for cooperating with a set of impulse turbine buckets 11a, 11b, 11c and 11d. It can be seen that the essential function of the nozzles 10 is to direct a high velocity jet of air from the exit thereof, for example, at 12b against the inner wall 13a of the turbine bucket 11a. The function of the nozzles is essentially that of changing the direction of the air jets so that the velocity impact thereof may most effectively be used to impart rotary motion to the turbine rotor mounting the turbine buckets 11. In the design of a set of such nozzles and buckets, the absolute velocity at the nozzles is added to the peripheral velocity of the turbine buckets vectorally and the result is the relative velocity of the turbine buckets. Such velocities are used to determine the absolute jet angle $a_1$ and the relative jet angle of $B_1$ for use in designing the turbine buckets. At the outlet of the turbine bucket the absolute angle is $a_2$ and the relative angle is $B_2$, as shown with respect to the turbine axis N—N, in the vector diagram of Figure 2.

In contrast, reaction nozzles 14a, 14b, and 14c, which are shown diagrammatically in position relative to reaction turbine buckets 15a, 15b and 15c, define passageways which increase in cross sectional area from inlet to outlet. For example, the cross sectional area of the passageway at the inlet 16a between the nozzle blades 14a and 14b is less than that of the outlet 17a between such nozzle blades. Likewise, the inlet 18a between turbine buckets 15a and 15b has a smaller cross sectional area than that of the outlet 19a between such turbine buckets. The net result is an expansion of the internally heated pressurized air as it passes through the nozzles and through the turbine buckets in a reaction turbine. The expansion in each case effects a corresponding drop in pressure; and the energy imparted to the turbine buckets (which is converted to torque energy) is generated to a substantial extent by expansion of the internally heated air.

Moreover, it can be seen that the absolute jet angle $a_3$ of reaction turbine buckets is smaller than the absolute angle $a_1$ of impulse type turbine buckets, thereby indicating the fact that reaction turbines are operated at slower jet velocities and revolutions per minute. The absolute jet angle $a_3$ of reaction turbine buckets ranges from 40° to 60°. In the instant invention, low turbine peripheral speeds are desired because such low speeds permit the use of low compressor peripheral speeds and therefore the generation of the relatively low compressed air pressures employed in the instant invention. Reaction turbines impart greater torque energy at lower speeds (than do impulse turbines) because the gas expansion force is exerted against the buckets in addition to the force imparted by the velocity impact.

Figure 3:
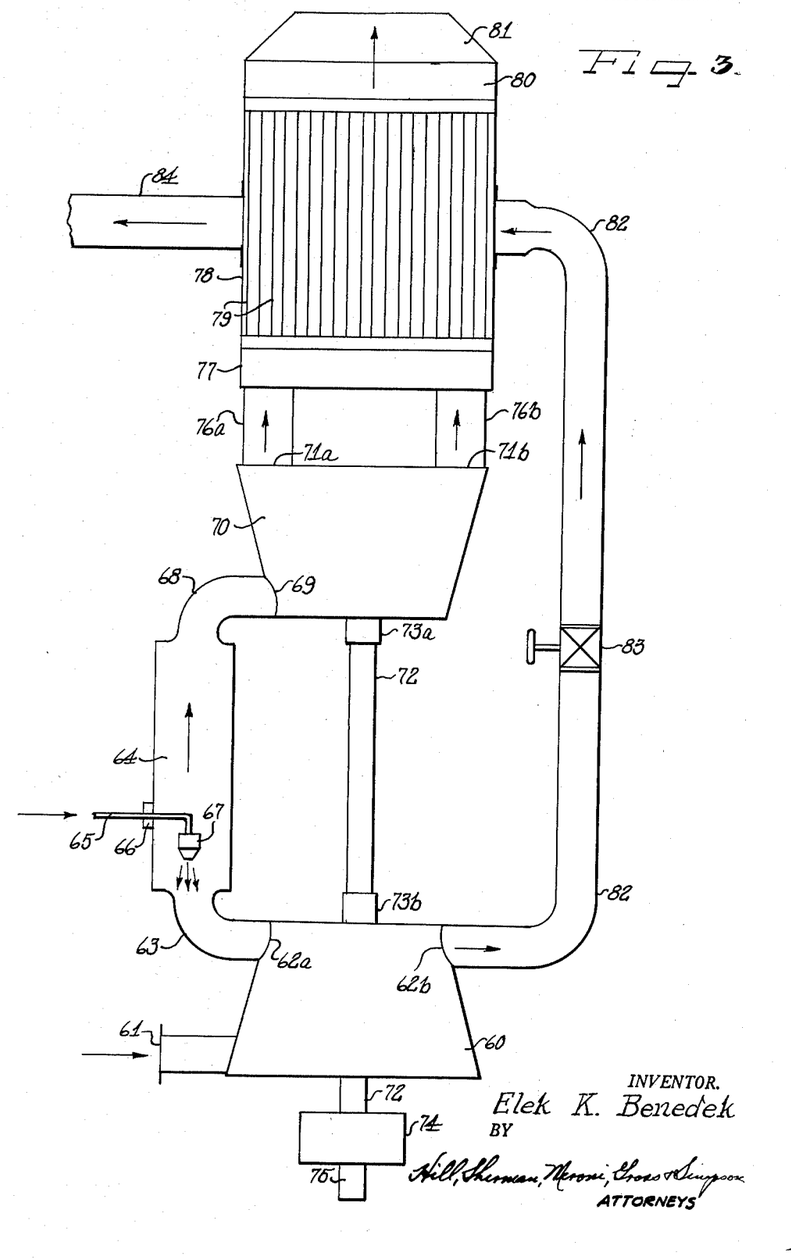
Figure 3 is essentially a diagrammatic view of an apparatus arrangement for practicing the invention.

Referring to Figure 3, the air compressor 16 withdraws air from the atmosphere as shown by the arrow at the inlet 61 of the compressor 60 and discharges compressed air at the outlets 62a and 62b of the compressor 60. The compressed air discharged from the outlet 62a passes through a suitable conduit 63 into a combustion chamber 64. Fuel is pumped through a fuel inlet 65 suitably mounted on the wall of the combustion chamber 64 at 66 and into a spray nozzle 67. The fuel sprayed from the spray nozzle 67, as shown by the small arrows, is burned in the compressed air flowing out of the compressor discharge 62a through the duct 63 into the combustion chamber 64. The compressed air thus internally heated by combustion passes out of the combustion chamber 64 through a duct 68 and into an inlet 69 of a gas turbine 70. The design and arrangement of the combustion chamber 64 may be altered for the purpose of producing the desired amount of internally heated air at a desired pressure. Ordinarily, ignition means (not shown) would also be included in the combustion chamber 64 suitably mounted near the spray nozzle 67.

The internally heated air passes from the turbine inlet through the turbine 70 and out the turbine discharges 71a and 71b. In passing through the turbine 70 the internally heated air operates the turbine so as to convert some of its energy to torque energy causing rotation of the turbine rotor (not shown) which in turn causes rotation of the shaft 72 upon which the rotor is mounted. The shaft 72 is mounted for free rotation upon suitable bearing means at 73a and 73b. An impeller (not shown) in the compressor 60 is suitably mounted on the shaft 72 and rotates therewith and is thereby driven by the gas turbine 70. At one end of the shaft 72 is a suitable coupling 74 which may be used to connect the shaft 72 to another shaft 75 which may be used in the operation of such auxiliary units (not shown) as a fuel pump, oil pump and a magneto.

As hereinbefore mentioned, the gas turbine is preferably a reaction turbine, which effects a reduction in the pressure of the internally heated air passing therethrough. In effect, the gas turbine furnishes the means whereby the work done by expansion of the internally heated gas is employed to operate the compressor 60 and thereby to compress additional free atmospheric air.

The internally heated air passes out of the turbine discharges 71a and 71b through suitably connected ducts 76a and 76b and into the inlet header 77 of a heat exchanger 78. From the heat exchanger inlet header 77 the internally heated air passes through tubes 79 of the heat exchanger 78 and into an outlet header 80 and thence to a discharge duct 81.

A portion of the atmospheric air withdrawn from the atmosphere at the compressor inlet 61, compressed in the compressor 60 and discharged through the compressor outlet 62b, is led through a duct 82, as shown by the arrows therein, through a valve 83 to the heat exchanger 78. The compressed fresh air passes through the space outside the tubes 79 in the heat exchanger 78 at a direction generally perpendicular to the direction of flow of the internally heated air through the tubes 79 and out the heat exchanger exit 84.

The valve 83 in the duct 82 is used to control the amount of compressed fresh air which is to be passed through the heat exchanger and externally heated therein by contact with the tubes 79, which in turn are heated by the internally heated air passing therethrough. Alternatively, the valve 83 may be positioned at the heat exchanger exit line 84 so as to control the flow of compressed fresh air therethrough. It may be advantageous to position the valve 83 at the exit 84 instead of the position shown in Figure 4 because a higher pressure can thereby be maintained in fresh air passing through the heat exchanger. Heat transfer is accomplished much more effectively by the use of air under pressure. On the other hand, if there is a substantial pressure drop across the valve 83, there will also be a noticeable temperature drop resulting from air expansion and it may be more desirable to effect such a temperature drop in the duct 82 prior to admission of the compressed fresh air into the heat exchanger 78. The design of the heat exchanger is also a consideration, since a triple-pass heat exchanger, for example, does not require as high a heat transfer efficiency across the individual tube walls that a relatively short single-pass heat exchanger (such as that shown in Figure 3) would require.

The apparatus arrangement of Figure 3 has a particularly important advantage in that all of the air compression is accomplished by a single compressor. Also, assuming a relatively constant flow of fuel into the combustion chamber 64, the operation of the entire apparatus may be controlled by the operation of the valve 83. In other words, the externally heated fresh air leaving the heat exchanger exit 84 may have high thrust energy and relatively low temperature if the valve 83 is opened wide. By opening the valve 83 wide, the amount of compressed air that is internally heated in the combustion chamber 64 is correspondingly reduced and, therefore, the total amount of enthalpy of the internally heated air entering the gas turbine is reduced. Alternatively, if the valve 83 is substantially closed so as to reduce appreciably the amount of compressed air that may flow through the duct 82, the amount of compressed air that passes through the combustion chamber 64 is correspondingly increased and the enthalpy of the internally heated air passing through the gas turbine is correspondingly increased.

By controllably varying the amount of fuel passing through the nozzle 67 (by a valve in the inlet line 65, for example), it is possible to additionally control the operation of the unit. If the valve 83 is used alone, it controls the unit chiefly on the basis of the distribution of the enthalpy in the compressed air at the compressor discharge. If the fuel input is used as a control, it controls the unit chiefly on the basis of enthalpy input by combustion.

Figures 4, 5:
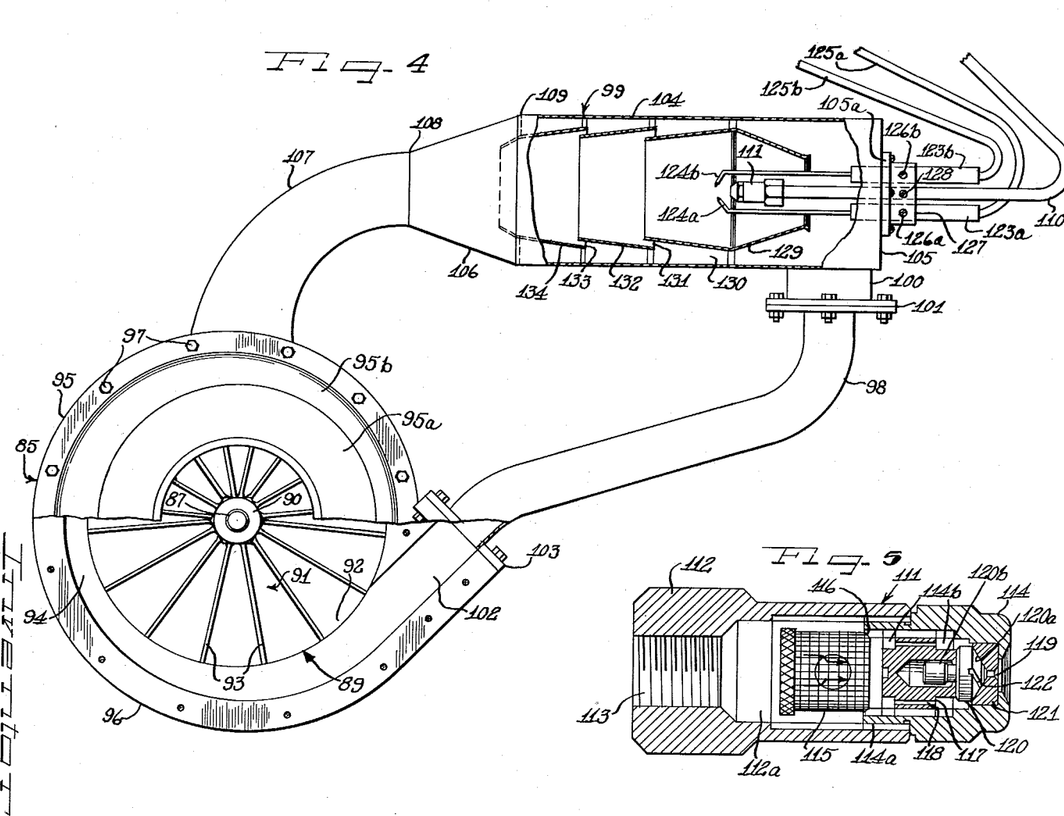
Figure 4 is an elevational view, with parts broken away and parts shown in section, of a hot gas generating unit for practicing the instant invention.
Figure 5 is an enlarged sectional detail view of the fuel nozzle shown in Figure 4.
Figure 6:
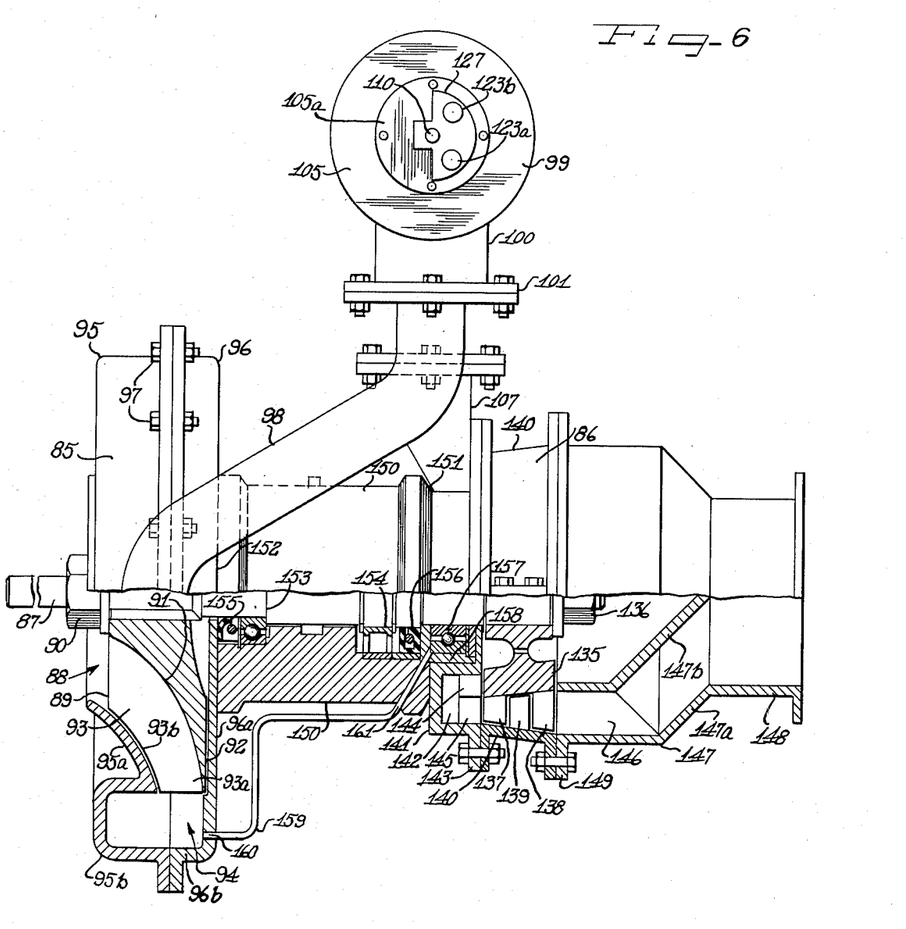
Figure 6 is an elevational view, with parts broken away and parts shown in section, of the hot gas generating unit of Figure 4, taken from the right hand side of Figure 4.

Referring to Figures 4 and 6, which show in detail a preferred compressor-turbine combination for the use in the instant invention, a compressor 85 and a turbine 86 are co-axially mounted on opposite ends of a shaft 87. The compressor 85 has a single annular entry 88 surrounding the shaft 87. The compressor 85 is a single stage centrifugal compressor having a single impeller 89, of the radial delivery type, suitably mounted on the shaft 87 for rotation therewith. For example, the impeller 89 may be mounted on the shaft 87 by means of splines and held in position to prevent axial motion with respect to the shaft 87 by a nut 90. The impeller 89 comprises a hollow boss 91, for receiving the shaft 87, the boss 91 being flared smoothly from its intake to its delivery end where it merges with a disk-like portion 92 extending in a plane generally perpendicular to the shaft 87. The blades 93 of the impeller 89 are integral with the boss 91 and are formed, for example, by machining from a stamping or forging. The blades 93 have a helicoidal form at their intake leading in the case of each blade to a substantially flat portion 93a, whereby air is delivered radially in relation to the impeller 89 into an annular chamber 94 formed by two generally annular housing members 95 and 96 which form a casing or housing for the impeller 89 and which are held together by bolts 97.

The intake housing member 95 defines the generally annular compressor intake 88 and extends radially therefrom to form a first housing portion 95a lying closely adjacent to the frontal edge 93b of the impeller blade 93 and a second portion 95b extending radially out from the first portion 95a which cooperates with the second housing member 96 to form the annular discharge chamber 94 of the compressor 85. The second housing member 96 extends radially outwardly from the shaft 87 to form a generally flat face portion at 96a lying closely adjacent to the back of the disk-like portion 92 of the impeller 89 and, just beyond the impeller's periphery, the second housing member 96 curves forward slightly to form a portion 96b which cooperates with the portion 95b of the intake housing to form the discharge chamber 94.

A discharge duct 98 communicates with the discharge chamber 94 to lead compressed air from the compressor 85 to a combustion chamber 99. The duct 98 is connected to the inlet 100 of the combustion chamber 99 by means of a bolted flange joint 101 and also to the compressor discharge 102 by means of a bolted flange joint 103.

The combustion chamber 99 comprises generally cylindrical walls 104 having an opening near one end thereof for receiving the combustion chamber inlet 100 and having at the same end a generally flat end wall 105. At the discharge of the combustion chamber 99 is mounted a generally frusto-conical chamber 106 to which is connected an internally heated air discharge duct 107. Preferably, the duct 107 is connected to the chamber 106 and the chamber 106 is connected to the cylindrical walls 104 by means of welded joints at 108 and 109, respectively.

The end wall 105 of the combustion chamber 99 is apertured centrally to receive a fuel intake line 110 which leads from a pressurized fuel source (not shown) outside the chamber 99 through the end wall 105 thereof and a short distance into the chamber 99. Threadedly mounted on the end of the feed line 110 extending into the chamber 99 is a spray nozzle 111.

The spray nozzle 111, shown in detail in Figure 5, comprises a base member 112 having internal threads 113 for engaging the end of the fuel line 110. Suitably rigidly mounted on the base member 112 is a head member 114 that is generally cylindrical in shape. The head member 114 has an open end 114a communicating with a generally cylindrical chamber 112a in the base member 112, which in turn communicates with the fuel line 110 normally engaging the threads 113. A filter 115 for removing harmful solid matter from the liquid fuel is positioned in the hollow chamber 112a of the base 112 and rests against an annular shoulder 116 formed at the open end 114a of the head member 114 (which faces the base member 112).

The generally cylindrical walls of the head member 114 define a chamber 114b wherein there is positioned a generally cylindrical mounting block 117, the cylindrical surfaces thereof lying adjacent the inner cylindrical walls of the head member 114. Peripheral passages 118 communicating with the chamber 114b formed by the cylindrical walls of the head member 114 are positioned closely adjacent to the cylindrical walls of the mounting block 117. At the end of the head member 114 facing away from the base member 112 is a restricted aperture 119. Suitably mounted on the mounting block 117 so as to be positioned between the mounting block 117 and the restricted aperture 119 is a flow director 120, for directing the flow of fluid out of axial alignment with the spray nozzle as it approaches the restricted opening 119, so as to effect a spraying of the fuel leaving the restricted opening 119.

The flow director 120 has a generally conical frontal face 120a lying closely adjacent to a cooperating concave shoulder member 121 mounted closely adjacent to the restricted opening 119 in the head member 114 and apertured at the concave apex thereof so as to communicate with the restricted opening 119. Generally radially extending grooves 122 lie in the face 120a of the flow director 120, so as to permit flow of fuel from the periphery of the conical face 120a to the apex thereof and thence through the apertured shoulder member and the restricted opening 119. The flow director has a boss 120b extending rearwardly of the frontal conical face 120a into a hollow portion of the mounting block 117 and the boss 120b is enlarged at the extremity thereof and thereby cooperates with the mounting block 117 at the hollow portion thereof so as to mount the flow director 120 in the mounting block 117.

As hereinbefore explained, the fuel flows through the fuel line 110 past the portion thereof mounted on the threads 113 and into the chamber 112a. The fuel then passes through the filter 115 and the chamber 114b passing through the peripheral passageways 118 and up to the periphery of the conical frontal face 120a of the flow director 120. The fuel is then forced through the generally radially extending grooves 122 on the frontal face 120a of the flow director 120 up to the apex of the conical face 120a and thence outwardly at a high rate of speed through the apertured shoulder member 121 and the restricted opening 119 so as to form a spray in the combustion chamber 99.

A pair of sleeves 123a and 123b are mounted suitably in apertures in the end wall 105 of the combustion chamber 99 so as to extend through the end wall 105. Slidably mounted in the sleeves 123a and 123b are a pair of electrodes 124a and 124b, which are in turn connected to an electrical power source (not shown) by electrical leads 125a and 125b. The electrodes 124a and 124b are held in position respectively by set screws 126a and 126b passing through the sleeves 123a and 123b. The set screws are suitably mounted on a brace 127 which in turn is mounted by means of a set screw 128 upon the fuel line 110 and also upon a central raised portion 105a of the end wall 105. The set screws 126a and 126b act to adjustably hold the electrodes 124a and 124b respectively in position with respect to the spray nozzle 111, so that the spark gap between the electrodes is suitably positioned with respect to the spray nozzle 111.

Within the combustion chamber 99 is suitably mounted a generally cylindrically shaped first burning chamber 129. One end of the chamber 129 encloses the spray nozzle 111 and the tips of the electrodes 124a and 124b. The chamber 129 also has a restricted opening at that end which has a cross sectional area of approximately one-fifth of the cross sectional area of the combustion chamber, so that approximately one-fifth of the compressed air entering at the inlet 100 of the combustion chamber 99 passes into the burning chamber 129. The remainder of the air flows through the annular passageway 130 between the walls of the combustion chamber and the walls of the first burning chamber 129. A portion of the compressed air flowing through the annular passageway 130 flows inwardly toward the center of the combustion chamber 99 through an annular inlet 131 defined by the walls of the first burning chamber 129 and the walls of a second burning chamber 132. The air entering the annular inlet 131 has been preheated to an appreciable extent by contact with the walls of the first burning chamber 129. In like manner, another portion of the air flowing through the annular passageway 130 outside the walls of the second burning chamber 132 passes through an annular inlet 133 formed between the walls of the second burning chamber 132 and those of a third burning chamber 134. The remainder of the air passes outside the walls of the third burning chamber 134 and into the chamber defined by the frusto-conical end member 106 of the combustion chamber 99.

By the use of the three successive burning chambers 129, 132, and 134, it is possible to obtain more efficient combustion of the fuel since fresh preheated air is admixed with the portions of air wherein combustion is taking place at a plurality of points in the course of the flow of the air wherein fuel combustion is taking place.

The internally heated compressed air thus obtained passes from the combustion chamber 99 into the discharge duct 107 and thence to the gas turbine 86.

The gas turbine 86 comprises a rotor hub 135 suitably mounted on the shaft 87 for rotation therewith so as to drive the shaft 87. The rotor hub is prevented from moving axially with respect to the shaft 87 by a nut 136 threadedly mounted on one end of the shaft 87. A first stage or series of turbine buckets 137 is suitably mounted on, preferably forming an integral part of, the rotor hub 135 at the intake peripheral portion thereof. A second stage or series of turbine buckets 138 is suitably mounted, likewise preferably forming an integral part of the rotor hub 135, but at the peripheral discharge portion thereof. Closely adjacent and between the first stage buckets 137 and the second stage buckets 138 there is arranged a series of stator turbine blades or nozzles 139 mounted on the inside walls of a generally cylindrical housing 140 which is positioned closely adjacent the peripheral portion of the first stage and second stage turbine buckets 137 and 138. The generally cylindrical housing 140 extends longitudinally from the forward edge of the first stage turbine buckets 137 to the back edge of the second stage turbine buckets 138 and has the stator blade 139 suitably mounted in the central portion thereof and extending inwardly therefrom.

A generally annular inlet housing 141 extends radially outwardly from the shaft 87 so as to form a generally annular turbine inlet chamber 142 facing the inlet side of the turbine rotor at approximately the same radial distance from the shaft 87 as that of the first series of turbine buckets 137. The inlet housing 141 is connected to the cylindrical housing 140 by means of a bolted flange joint 143.

Suitably mounted on an annular ring 144 positioned at the mouth of the intake chamber 142 and lying closely adjacent the intake side of the rotor hub 135 are a series of blades or nozzles 145 which extend radially across the annular passageway leading from the intake chamber 142 to the first stage of turbine buckets 137.

As hereinbefore mentioned, the turbine 86 is a reaction turbine. Therefore, the blades are so designed and arranged in the nozzle series 145, the first stage 137, the stator series 139 and the second stage 138 that expansion of the internally heated air takes place while passing through each of the foregoing series of blades. It is also understood, of course, that the blades in each of the foregoing series are so arranged that the air flow therethrough imparts torque energy to the shaft 87 in the same direction at both the first stage and the second stage turbine buckets 137 and 138.

The internally heated air passes from the second stage turbine buckets 138 into a generally annular discharge chamber 146 formed by a discharge housing 147 which comprises a pair of generally frusto-conically shaped concentric walls 147a and 147b so that the annular discharge passageway 146 ultimately converges into a single discharge duct 148 which may be used for communication with a heat exchanger (not shown).

The shaft 87 is positioned axially with respect to a generally cylindrical bearing housing 150, which is positioned between the compressor 85 and the turbine 86. Suitably mounted at one end of the bearing housing 150, for example at 151 by disengageable connection, is the annular intake housing 141 of the turbine 86. Suitably mounted, for example by another disengageable connection at 152, is the second housing member 96 of the compressor 85.

The shaft 87 passes freely through the housing members 95 and 96 of the compressor 85, the bearing housing 150, and the inlet and cylindrical housing members 141 and 140 of the turbine 86. The shaft 87 is mounted for free rotation in the bearing housing 150 on anti-friction means, for example, on a bearing race 153 suitably mounted near one end of the bearing housing 150 and on a second bearing race 154 suitably mounted at the other end of the bearing housing 150. Oil is supplied to each of the bearing races 153 and 154 by suitable means (not shown). The oil applied to the shaft is confined between an oil seal 155 adjacent to and outside of the bearing race 153 at one end of the bearing housing 150 and a second oil seal 156 adjacent and outside of the bearing race 154 mounted at the other end of the bearing housing 150.

As shown in Figure 6, the bearing means 153 and 154 are the sole supporting means for the shaft 87. It can thus be seen that both the compressor impeller 89 and the turbine rotor hub 135 are overhung. In other words, the shaft 87 is supported by the bearing means 153 on only one side of the impeller 89, and the shaft 87 is supported by bearing means 154 also on only one side of the turbine rotor hub 135. Such an arrangement facilitates greatly the assembly and disassembly of the unit.

An additional feature of the instant invention, as shown in Figure 6, resides in a means for protecting the anti-friction means carrying the shaft 87 from damage by heat. The internally heated gases enter the turbine 86 at very high temperatures and, since the elements of the turbine 86 are metallic and therefore readily capable of conducting heat, a substantial amount of heat may be conducted, for example, from the turbine buckets 137 and 138 through the turbine rotor hub 135 to the shaft 87. The heat may then be conducted back down the shaft 87 toward the bearing housing 150. It is, of course, apparent that the oiled bearing race 154 cannot operate suitably at extremely high temperatures, particularly, at temperatures which tend to volatilize or decompose the lubricating oil.

In the instant apparatus, means are provided for cooling a portion of the shaft between the bearing means 154 and the rotor hub 135. A small annular chamber 157 is defined by a housing 158 comprising a pair of annular walls extending radially a short distance from the shaft 87 and having the peripheral portions thereof spaced apart and connected to a cylindrical wall. The chamber 157 surrounds a portion of the shaft 87 between the intake housing 141 and the bearing housing 150. A small compressed air tube 159 communicates with the discharge chamber 94 of the air compressor 85 through an aperture 160 in the air compressor housing member 96. The compressed air tube 159 also communicates with the chamber 157 by means of an aperture 161 in the bearing housing 150. The compressed air tube 159 thus supplies relatively cool compressed air to the chamber 157 under sufficient pressure to cause a flow of cooling air through the chamber 157 because of leakage, for example, between the chamber 158 and the shaft 87.

If it is desired to employ relatively heavy equipment of the design shown in Figure 6, it may be necessary to employ additional bearing means in order to obtain suitable free rotation of the shaft 87. In such case, as shown in Figure 6, a dry bearing system (i. e., a bearing system which does not require oil lubrication) may be installed in the annular chamber 157. The function of the compressed air tube 159 would then include cooling of the dry bearing means as well as the shaft in the neighborhood of the chamber 157.

The compressor-turbine unit shown in Figures 4 and 6 is so designed that it may operate at sufficiently low pressure in the combustion chamber that the internally heated air so produced may be reduced to substantially atmospheric pressure by passing through the turbine 86. In other words, by the use of a two stage reaction turbine such as the turbine 86 it is possible to obtain a substantial pressure reduction in the internally heated air passing therethrough. Also, in a two stage turbine the maximum speed of rotation that may be generated is the maximum speed that can be obtained in passing the relatively low velocity internally heated air through the second stage 138 of the turbine 86. In other words, there is a velocity as well as a pressure drop across each stage in the turbine. On the other hand, the combined amount of torque energy withdrawn from the internally heated air by the two stages is sufficient to impart a comparatively strong torque force to the shaft 87 at a comparatively low R. P. M. rate. Hence that torque force is sufficient to operate the impeller 89 of the air compressor 85 at a relatively slow speed in revolutions per minute. The air compressor 85, in turn, is therefore capable of producing air at a relatively low pressure which is accordingly supplied to the combustion chamber. In an ordinary jet engine certain rated speeds in revolutions per minute must be maintained in order to have effective operation because there is insufficient total torque energy imparted to the turbine rotor at low peripheral speeds to effectively operate the air compressor.

As an example by way of explanation, assume that it is attempted to operate a jet engine having a high rated speed by the use of a low pressure in the combustion chamber. As the pressure is reduced in the chamber the jet speed of the internally heated air passing through the turbine is reduced and the R. P. M. of the turbine rotor are therefore reduced. As the R. P. M. of the turbine rotor are reduced, the total torque energy thereof is increasingly reduced and the net result is that the impeller speed in the compressor is reduced and that the pressure at the discharge of the compressor is therefore reduced. The only possible way of adding energy to the internally heated gas so that it can maintain the rated turbine speed is to increase the amount of fuel burned. However, the extent to which an increase may be made in the amount of fuel burned is very limited because the combustion chamber is relatively small. As soon as the pressure in the combustion chamber is reduced to a point that it is not possible to burn additional fuel, effective operation of the jet engine is lost, and the operation slows down continuously and automatically until all pressure is lost in the combustion chamber.

In the instant apparatus, however, a combustion chamber of suitable size is provided so that combustion of a sufficient amount of fuel at relatively low pressures may be carried out to supply the necessary amount of energy to the gas turbine to operate the compressor. The gas turbine has the additional feature of being capable of operating at comparatively low peripheral speeds so as to have sufficient torque energy at these speeds to operate the compressor.

As hereinbefore mentioned, in the instant process, combustion is preferably carried out at from 1½ to 2 atmospheres pressure (i. e. about 7½–15 pounds per square inch gauge pressure) in the combustion chamber. In some instances it is possible to operate suitably at pressures as low as about 1⅓ atmospheres; and in other situations, comparatively efficient operation at 3 atmospheres may be obtained. By the use of such low pressures it is possible to cut to a minimum the enthalpy losses in the form of mechanical energy passing through the turbine. Most of the mechanical energy resulting from the expansion of the internally heated air (to atmospheric pressure) is converted to useful torque energy by the turbine and, of course, some thrust is necessary to push the hot turbine discharge air through the heat exchanger. The minimum amount of mechanical energy which must be imparted to the turbine by the internally heated gas, in the practice of the invention, is that amount necessary to operate the turbine so as to maintain continuous combustion at least 1½ atmospheres pressure and to force the internally heated gas through the heat exchanger.

Obviously, that minimum amount of energy represents more than the total enthalpy generated in the compressor, and it is necessary to add to that total a certain additional amount of enthalpy by combustion in the pressurized air discharged from the compressor. Accordingly, the instant combustion chamber must be of sufficient size to permit the combustion of a sufficient amount of fuel therein at a pressure of at least 1½ atmospheres to effectively impart to the air the additional amount of enthalpy required in order to accomplish continuous operation. If, as in the case of jet engines, the combustion chamber is of insufficient size to accommodate the required amount of combustion therein at pressures as low as 1½ atmospheres, then there is no way of continuously operating such a unit on a "self-energizing" basis at these low pressures.

It has been found that, in the practice of the invention, the total amount of enthalpy added to the air by combustion must be at least one-half of the amount of enthalpy added to the air by compression thereof to superatmospheric pressure and, preferably, at least equal to the amount of enthalpy added to the air by compression. In other words, the combustion step must effect an increase of at least 50%, and preferably at least 100%, in the total enthalpy of the pressurized air above what would be the total enthalpy of the air at standard conditions of temperature and pressure (namely, about 124.6 B. t. u. per pound).

It is also desirable that the pressurized air be heated by combustion to at least about 800° F. and preferably to at least about 1000° F., in order to effect the subsequent external heating of the fresh air stream to a suitably high temperature. Ordinarily, it is not desirable to heat the air to above about 1500° F. in the combustion step, and preferably not above 1200° F., unless the heater efficiency is to be sacrificed temporarily in order to obtain an extremely high heat output.

It is, of course, appreciated that the rate at which combustion may be carried out is very substantially increased by the use of superatmospheric pressures even as low as about 1½ to 2 atmospheres. The instant heater, therefore, delivers a great deal more B. t. u. per unit of time than would a heater of comparable size operating at atmospheric pressure. The actual speed at which combustion of a fuel takes place in air depends to a very substantial extent upon the air pressure. It can, of course, be appreciated that the amount of fuel pumped into the pressurized combustion chamber 99 of the instant invention may be so great that combustion cannot be completed therein. As a consequence, partial combustion only would take place in the combustion chamber 99 and the remainder of the combustion may take place in the air passing through the turbine 86, and even to a limited extent in the heat exchanger. But for such complications as soot formation and the like, the efficiency of operation of the instant invention would not be effected appreciably in such situations, since the object of the instant invention is to transfer as much as possible of the energy generated by combustion to the heat exchanger in the form of heat, as contrasted to conversion to mechanical energy at the turbine.

Another advantage of the present invention resides in the fact that the performance characteristics of heaters of the instant invention may be varied appreciably by varying the number of compressor or turbine stages employed. It can thus be seen that it is possible to so design a heater of the present invention, by the selection of the proper number of compressor and turbine stages and by designing the compressor and turbine stages, that optimum performance characteristics may be obtained in each of a variety of special uses for the heaters of the invention.

As is well known, in the centrifugal air compressors used in the invention, the compression ratio or the extent to which inlet air is compressed is dependent principally on the centrifugal force generatable at the impeller. That centrifugal force is, of course, a function of the impeller size (diameter) and the speed of rotation (R. P. M.). From the point of view of wear and tear, it is always desirable to operate at a minimum R. P. M. rate and, from the point of view of compactness, it is desirable to employ impellers of minimum size. The instant invention provides for a great deal of flexibility in accomplishing these desired results.

I claim as my invention:

1. A method of heating space at atmospheric pressure with hot atmospheric air, that comprises (a) heating a predetermined amount of air internally to 800–1500° F. by fuel combustion therein at 1⅓ to 2 atmospheres, (b) adiabatically-expanding said internally heated air obtained in step (a) from 1⅓ to 2 atmospheres pressure to substantially atmospheric pressure and converting substantially all of the enthalpy thus lost from the air obtained in step (a) to torque energy, (c) compressing atmospheric air to 1⅓ to 2 atmospheres pressure using substantially all of said torque energy, (d) withdrawing the predetermined amount of air for step (a) from the compressed air of step (c), (d) adiabatically throttling to substantially atmospheric pressure the air obtained in step (c) remaining after that used for step (a) has been withdrawn and then bringing said remaining air into heat exchange contact with the adiabatically-expanded air obtained from step (b) to heat said remaining air, and then (e) delivering the heated remaining air into the space to be heated.

2. A method as claimed in claim 1 wherein step (d) is carried out by heating a medium with the adiabatically expanded air obtained by step (b) and then heating said remaining air with said medium while said medium maintains said remaining air separate and apart from sad adiabatically expanded air obtained by step (b).

References Cited in the file of this patent
UNITED STATES PATENTS

| | | |
|---|---|---|
| 1,997,229 | Noack et al. | Apr. 9, 1935 |
| 2,415,064 | McCollum | Jan. 28, 1947 |
| 2,428,330 | Heppner | Sept. 30, 1947 |
| 2,478,504 | Ruegg | Aug. 9, 1949 |
| 2,590,109 | Lindenbaum | Mar. 25, 1952 |
| 2,613,501 | Price | Oct. 14, 1952 |
| 2,611,241 | Schulz | Sept. 23, 1952 |
| 2,632,297 | Ogston | Mar. 24, 1953 |

OTHER REFERENCES

"Powers" magazine "160 Hp. Gas.-Turbine Unit Will do Many Chores;" pages 98, to 101; Jan. 1, 1950 126/110.